(12) United States Patent
Longacre et al.

(10) Patent No.: US 7,185,924 B1
(45) Date of Patent: Mar. 6, 2007

(54) JOINT RESTRAINT ASSEMBLY

(75) Inventors: Charles J Longacre, Danielsville, PA (US); David F. Toler, Easton, PA (US)

(73) Assignee: Sigma Corporation, Cream Ridge, NJ (US)

( * ) Notice: Subject to any disclaimer, the term of this patent is extended or adjusted under 35 U.S.C. 154(b) by 0 days.

(21) Appl. No.: 10/637,139

(22) Filed: Aug. 8, 2003

(51) Int. Cl.
F16L 21/00 (2006.01)

(52) U.S. Cl. ........................ 285/404; 285/337

(58) Field of Classification Search .............. 285/3, 285/337, 411, 420, 414, 404, 415, 374
See application file for complete search history.

(56) References Cited

U.S. PATENT DOCUMENTS

| | | | |
|---|---|---|---|
| 817,300 | A | 4/1906 | David |
| 3,333,872 | A | 8/1967 | Crawford, Sr. et al. |
| 3,726,549 | A | 4/1973 | Bradley, Jr. |
| 4,092,036 | A | 5/1978 | Sato et al. |
| 4,397,485 | A | 8/1983 | Wood |
| D294,384 | S | 2/1988 | Endo et al. |
| 4,779,900 | A | 10/1988 | Shumard |
| 4,848,808 | A | 7/1989 | Pannell et al. |
| 4,896,903 | A | 1/1990 | Shumard |
| 4,940,259 | A | 7/1990 | Williams |
| 5,071,175 | A | 12/1991 | Kennedy, Jr. |
| 5,772,252 | A * | 6/1998 | Malani ................. 285/374 |
| 6,173,993 | B1 * | 1/2001 | Shumard et al. .......... 285/404 |
| 6,322,273 | B1 | 11/2001 | Gentile, Jr. |
| 6,739,631 | B2 * | 5/2004 | Smith et al. ............. 285/337 |

OTHER PUBLICATIONS

Brochure-SIGMA/NAPPCO, Superlug™, 3 pages, 1995, New Jersey.
Brochure-EBAA Iron Sales, Inc. Series 3000 Multi-Purpose Wedge Action Restraint, 1 page, Jun. 1997, Texas.
Brochure-EBAA Iron Sales, Inc. Series 2000PV Megalug Retainer Glands for PVC Pipe with Cast-Iron or I.P.S. Outside Diameters with M.J. Bells, 2 pages, Nov. 1991, Texas.
Brochure-EBAA Iron Sales, Inc. Wedge Action Megalug, 6 pages, Jan. 1992, Texas.
Brochure-Ford Meter Box Co., Inc. Uniflange®Series 1500 "Circle-Lock" for PVC Pipe, 8 pages, Mar. 1998, Indiana.
Brochure-Star®Pipe Products, Inc. Stargrip® Star®Pipe Introduces the New Generation Mechanical Joint Restraint System for Ductile Iron Pipe, 2 pages, 1999, Texas.

* cited by examiner

Primary Examiner—Aaron Dunwoody
(74) Attorney, Agent, or Firm—Caesar, Rivise, Bernstein, Cohen & Pokotilow, Ltd.

(57) ABSTRACT

A joint restraint assembly for connecting pipe ends together, or to other objects, which includes a body encircling the pipe. The body has a plurality of cavities adjacent to the pipe with a segment configured to fit into each cavity. One or more threaded bores are disposed through the body into each cavity. A threaded bolt extends through each threaded bore to engage the segment in that cavity, and to pre-load the segment against the pipe when assembled thereon. Mechanical or pressure loading, tending to pull the pipe out of the restraint assembly, causes the segment to self actuate, and the application of increasing load causes a proportional increase to the force engaging the segment to the pipe. The joint restraint assembly reliably accommodates comparatively high levels of mechanical loading and/or pipe internal pressure, and does so without relying upon the limited force produced by the threaded bolt pre-load on the segments at the time of assembly.

14 Claims, 9 Drawing Sheets

JOINT RESTRAINT ASSEMBLY

BACKGROUND OF THE INVENTION

1. Field of Invention

The present invention relates to a joint restraint assembly. More particularly, the present invention relates to a joint restraint assembly for connecting pipes together, or to other objects.

2. Description of Related Art

Joint restraint assemblies of several types are known in the art and which comply with pipe connection standards, such as the ANSI/AWWA C111/A21.11, entitled "American National Standard for Rubber-Gasket Joints for Ductile-Iron Pressure Pipe and Fittings." A conventional restraint assembly comprises an annular body having a plurality of threaded bolts equally spaced around the body, with the threaded bolts extending through threaded bores disposed through the body along radial lines, or radial lines inclined at an angle of less than 90 degrees from the pipe axis. The end of each bolt is configured to directly bear on the pipe surface or another component that, in turn, bears on the pipe surface. The head of each bolt typically includes a torque head with a feature that is designed to shear when a predefined torque is applied to the bolt. The shear feature is intended to result in the application of a specific torque to each bolt without the use of a torque measuring wrench.

Once the joint restraint assembly is positioned adjacent the end of a pipe, the pipe end is mated into the socket and then the flange portion of the joint restraint is secured to a corresponding flange portion on the socket side via flange-connecting fasteners (e.g., "T-bolts"). See, for example, U.S. Pat. No. 3,333,872 (Crawford, Sr. et al.); U.S. Pat. No. 3,726,549 (Bradley, Jr.); U.S. Pat. No. 4,848,808 (Pannell et al.) and U.S. Pat. No. 4,779,900 (Shumard). It should be understood that subsequent reference to "bolt" hereinafter refers to the bolts used to secure the joint restraint assembly to the pipe end and not to the flange-connecting fasteners used to secure the flanges together unless indicated.

In some conventional restraint assemblies, the end of each bolt is either configured to penetrate the surface of the pipe or to bear upon a pad, clamping block, or segment with one or more gripping teeth to penetrate the surface of the pipe. In conventional restraint assemblies that utilize segments with one or more gripping teeth to penetrate hard pipe materials, such as ductile iron, the length of the gripping teeth penetrating the pipe surface and the depth of the penetration are limited by the force produced as a result of applying the specified torque to the threaded bolt. As a result, a conventional restraint assembly applies loading that is localized at the positions of the threaded bolts or clamping blocks. The allowable mechanical or pressure loading, tending to pull the pipe out of the restraint assembly, is limited by the shear strength of the pipe material and the area of the pipe material that would have to shear in order to permit the penetrating gripping teeth to slip along the pipe surface, with that shear area being related to the penetration depth of the gripping teeth into the pipe material and the circumferential length of the penetration. The allowable mechanical or pressure loading, tending to pull the pipe out of the restraint assembly, is also limited by the shear strength of the segment material and the area of the segment gripping teeth that would have to shear in order to separate the gripping teeth from the segment, with that shear area being related to the penetration depth of the gripping teeth into the pipe material and the circumferential length of the penetration. Accordingly, conventional restraint assemblies are often inadequate for comparatively high levels of mechanical loading and/or pipe internal pressure. See, for example, U.S. Pat. No. 817,300 (David); U.S. Pat. No. 3,333,872 (Crawford, Sr. et al.); U.S. Pat. No. 3,726,549 (Bradley, Jr.); U.S. Pat. No. 4,397,485 (Wood); Des. 294,384 (Endo et al.);

One type of conventional restraint assembly in the prior art comprises an annular body having a plurality of cavities adjacent to the pipe with a clamping block configured to fit into each cavity. See, for example, U.S. Pat. No. 4,092,036 (Sato et al.); U.S. Pat. No. 4,779,900 (Shumard); U.S. Pat. No. 4,896,903 (Shumard) and U.S. Pat. No. 5,071,175 (Kennedy, Jr.). A plurality of bolts equally spaced around the body, disposed through the body along radial lines inclined at an angle of less than 90 degrees from the pipe axis, that extend through non-threaded oval holes into the cavities. The inboard surface of each cavity is perpendicular to the axis of the oval hole such that it is inclined to the axis of the pipe. Each bolt is configured with an integral annular flange, or collar, that is slidably in contact with the inclined surface of the cavity, and the threaded shank of each bolt is engaged in a threaded hole in the corresponding clamping block. Each clamping block is configured with teeth to directly bear on the pipe surface. When the threaded bolt is turned, force is applied to the clamping block causing the teeth to dent the pipe surface. An equal and opposite force is applied to the contact between the integral annular flange of the bolt and the inclined surface of the cavity. These contact surfaces are not polished and lubricated, and they are usually covered with a protective coating. (See for example EBAA Iron Sales, Inc., Wedge Action Megalug™ Field Installed Joint Restraint; EBAA Iron Sales, Inc., Series 3000 Multi-Purpose Wedge Action Restraint; or EBAA Iron Sales, Inc., Series 2000PV Megalug™ Retainer Glands for PVC Pipe with Cast-Iron or I.P.S. Outside Diameters with M. J. Bells). The service environment ordinarily results in corrosion, sediment particulate and other conditions that do not permit a low coefficient of sliding friction between the integral annular flange of the bolt and the inclined surface of the cavity.

The concept of this "wedge" type of restraint assembly is that as the mechanical or pressure loading tends to pull the pipe out of the restraint assembly, the annular flange on the threaded bolt slides along the inclined surface of the cavity causing the clamping block teeth to dent the pipe surface more deeply, thereby resisting the tendency of the pipe to pull out of the restraint assembly. In practice, the frictional forces that resist sliding between the annular flange on the bolt and the inclined surface of the cavity are proportional to the force being applied to dent the pipe and, in combination with the mis-alignment of the force vectors tending to cause the annular flange of the bolt to bind instead of slide, the theoretical effect is only partially realized. All of the "wedge" type prior art has this inherent characteristic which limits its effectiveness. One manufacturer of this type of joint restraint assembly explains in its publications that this type of restraint works without wedge movement to resist normal operating pressure in the pipe, but wedge movement responds "only as the external force is increased" from additional external conditions such as subsidence, water-hammer, traffic loads or small tremors (EBAA Iron Sales, Inc., Wedge Action Megalug™ Field Installed Joint Restraint). However, in the normal operation of this type of restraint assembly, the force generated by the bolt is applied to the clamping block causing its teeth to dent the pipe surface, and if the wedge effect is able to overcome its inherent sliding friction and binding characteristics, it does so, inefficiently, only under additional external loading conditions.

Another type of conventional restraint assembly in the prior art comprises an annular body with equally spaced cavities with a segment configured to fit into each cavity. A threaded bolt extends through a threaded bore into each cavity, and the force generated by the threaded bolt is applied to the segment to cause the edges of the segment to dent the pipe surface. The end of the threaded bolt is manufactured with a hemispherical form, and it fits into a dished socket in the segment. (See Sigma/Napco, SuperLug™, Pipe Restraints for Ductile Iron Pipe). The manufacturer's publications state that: the ball and socket allows lug deflection at any angle, thereby allowing the lugs to "rock", actually gripping the pipe more securely as pressure-induced load increases; and pressure-induced load causes the primary contact edge of the SuperLug™ teeth to "grab" the pipe surface, further increasing pressure-induced load restraint.

However, testing of this design in larger sizes, such as for 30 to 48 inch diameter pipes, revealed that the force of the radial threaded bolt, even in combination with the "rocking" or "cam action", was insufficient to adequately grip the pipe, and other undesirable effects occurred such as bending of the threaded bolt. A parametric analysis of the design revealed that the pressure-induced load, tending to pull the pipe out of the restraint assembly, overpowered the capability of the design as the pressure-induced load increased with the square of the pipe diameter. Using a restraint assembly for 48 inch pipe as an example, the total axial load is in excess of 1,000,000 pounds during the hydrostatic proof test at 500 psi pressure. This requires each of 32 segments, and the threaded bolt forcing it into the surface of the pipe, to resist almost 32,000 pounds of pressure-induced load. When tightened to the specified torque, the threaded bolt is capable of applying 7,500 pounds of force to the segment, causing its edges to dent the surface of the pipe, but the indentation was not of sufficient depth and circumferential length to resist the 32,000 pounds of pressure-induced load. With the known shear strength of the pipe material, the required shear area of the pipe material that would have to resist shearing in order to prevent the penetrating, gripping teeth from slipping along the pipe surface, requires both a greater depth of penetration into the pipe material and a greater circumferential length of that penetration.

It would be desirable for a restraint assembly to overcome the inherent problems and limitations in the prior art and reliably accommodate comparatively high levels of mechanical loading and/or pipe pressure, and to do so without relying upon the limited force produced by the application of the specified torque to the threaded bolts.

The entire disclosures of all of the references cited herein are incorporated by reference.

BRIEF SUMMARY OF THE INVENTION

A joint restraint assembly for connecting pipe ends together, or to other objects, by gripping the outer surface of the pipe. The joint restraint assembly comprises: a body encircling the pipe, with the body having a plurality of cavities adjacent the pipe and at least one set of a corresponding plurality of threaded bores disposed through the body, and wherein each threaded bore of the at least one set of a corresponding plurality of threaded bores is in communication with a respective cavity; a segment disposed within each of the cavities in the body, and configured to make contact between the body and the surface of the pipe so as to provide resistance to pipe pull-out in proportion to the mechanical and/or internal pressure loading applied to the pipe (e.g., a self-actuating member); and a threaded bolt extending through each of the threaded bores to pre-load the respective segment into initial contact with the pipe surface.

A method for providing a joint restraint assembly with resistance to pipe pull-out in proportion to the mechanical and/or internal pressure loading applied to a pipe. The method comprises the steps of: providing a body that encircles the pipe wherein the body has a plurality of cavities and at least one set of a corresponding plurality of threaded bores disposed through the body, with the cavities being disposed adjacent the pipe; disposing a segment within each of the cavities; pre-loading the segment against the pipe by rotating a corresponding bolt disposed in each threaded bore of the at least one set of a corresponding plurality of threaded bores; permitting the segment to move within the cavity, independently of the bolts, in response to pipe pull-out forces, and wherein the segment is self-actuating and orients itself so that the segment is in contact with the body and the pipe surface and generates a resistance to the pipe pull-out forces in proportion to the mechanical and/or internal pressure loading applied to the pipe.

BRIEF DESCRIPTION OF SEVERAL VIEWS OF THE DRAWINGS

The invention will be described in conjunction with the following drawings in which like reference numerals designate like elements and wherein:

FIG. 2 is an elevation section view of the joint restraint assembly body taken along section plane A—A of FIG. 1a;

DETAILED DESCRIPTION OF THE INVENTION

Figure 1:
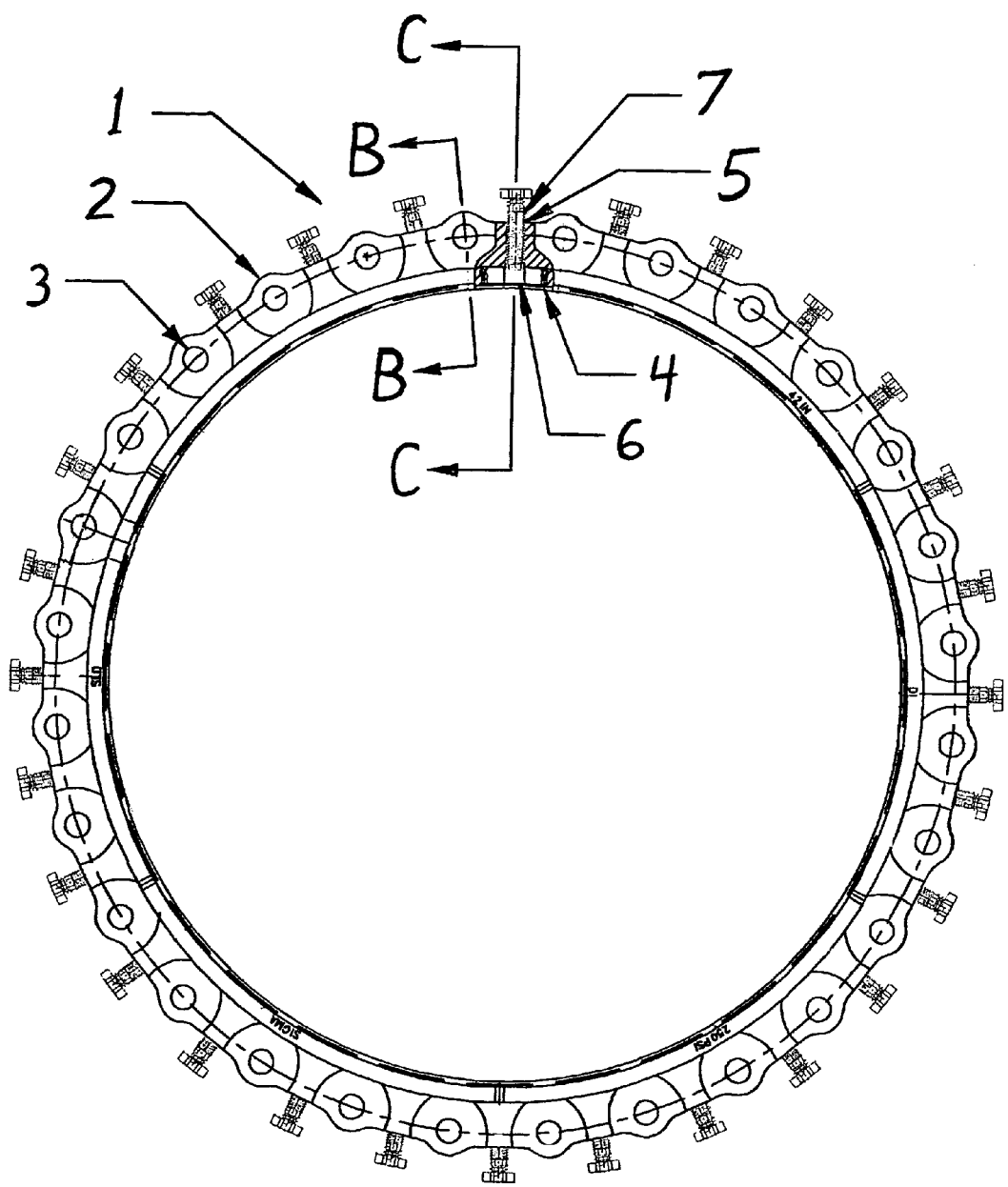
FIG. 1 is an elevation view, or end view opposite the gasket side, of a joint restraint assembly embodying the present invention.

The present invention relates to a joint restraint assembly. More particularly, the present invention relates to a joint restraint assembly for connecting pipes together, or to other objects. Although the following description of the preferred embodiment is considered by the inventors to be the best mode of carrying out the invention, the claims presented below are not limited to the particular details of the described embodiment. Many variations of the particular details of the described embodiment may be apparent to those skilled in the art which would provide for construction of the joint restraint assembly incorporating the principles of the present invention as claimed.

The present invention provides a joint restraint assembly suitable for connecting pipe that is subjected to comparatively high levels of mechanical loading and/or pipe internal pressure. The assembly includes a body encircling the pipe, with said body having a plurality of cavities adjacent to the pipe. A segment is configured to fit into said cavity and one or more threaded bores are disposed through the body into each cavity. A threaded bolt extends through said threaded bore to engage the segment in that cavity. The threaded bolt has a head suitable for applying torque to the bolt and may include a feature to limit the maximum torque which can be applied. When the specified torque is applied to the bolt head at the time of assembly, the force developed by the bolt serves to pre-load the segment against the pipe. Mechanical and/or pressure loading, tending to pull the pipe out of the restraint assembly, causes relative movement between the pipe and the restraint assembly. This relative movement causes the segment to firmly contact the interior corner of the cavity, and the application of increasing load and the associated relative movement, causes the segment to rotate resulting in a proportional increase to the force engaging the segment to the pipe. This action of the segment is herein referred to as self-actuating. It should also be understood that subsequent reference to "mechanical and/or pressure loading" hereinafter includes the relative movement between the pipe and the joint restraint assembly that occurs as a result of the application of the mechanical and/or pressure loading. It should be further understood that this relative movement is not to be confused with slippage of the restraint assembly along the surface of the pipe.

The segment is configured to contact the surface of the pipe. The segment may function in a manner similar to a cam, pawl, dog, or other self-actuating member, and it may possess a surface treatment (e.g., a knurled surface) intended to reduce the likelihood of slipping on the pipe surface. To minimize the likelihood of slipping on the pipe surface, the segment of the preferred embodiment is configured with one or more edges capable of penetrating the external surface of the pipe Each edge is circumferentially-contoured to approximately match the curvature of the pipe. The segment, and each edge thereon, is of sufficient circumferential length to distribute the applied loading over a substantial portion of the pipe periphery. The segment possesses a form wherein the application of mechanical loading or pipe internal pressure causes the corner of the segment to contact an interior corner of the cavity to serve as a pivot for the segment. As a result, the loading transmitted from the pipe through the edge of the segment is transmitted to the corner of the segment in contact with the interior corner of the cavity. Accordingly, the loading from the edge of the segment, through the segment, to the corner contact location produces a state of stress in the segment that is primarily compressive. Transmitting the loading in this manner minimizes the tendency of the segment material to fracture. The relief angle adjacent to each edge of the segment, as measured from the pipe surface, is optimized to maximize the load transmission capability from the segment edge into the segment body while permitting the segment edge to penetrate the pipe surface sufficiently to prevent slippage of the joint restraint assembly relative to the pipe.

With this segment configuration, the function of the threaded bolt is reduced to pre-loading the segment against the pipe surface, at the time of assembly, sufficiently to resist handling loads and low levels of internal pipe pressure. Upon the application of sufficient mechanical and/or internal pressure loading, a corner of the segment is caused to firmly contact an interior corner of the cavity, and the continued application of mechanical and/or internal pressure loading causes additional rotation of the segment between the interior corner of the cavity and the pipe surface. In doing so, the segment performs in a self-actuating manner where the force tending to cause the segment edge to penetrate deeper into the pipe surface is proportional to the increase in mechanical and/or internal pressure loading. Accordingly, the entire length of the segment edge is caused to penetrate deeper into the pipe surface as required to resist the applied loading, well beyond the penetration achievable from the force applied by the threaded bolt alone or any prior art arrangement. The threaded bolt does not contribute to securing the joint restraint assembly onto the pipe during higher levels of loading.

The self-actuating function of the segment produces internal force vectors with, in part, force vector components parallel to the surface of the pipe that resist movement due to the mechanical and/or internal pressure loading on the pipe tending to pull the pipe out of the joint restraint assembly. The body of the joint restraint assembly includes a radial flange having multiple axial apertures, equally spaced around the body, through which the flange-connecting fasteners are installed to secure the joint restraint assembly to another restraint assembly or another object. The difference in the radial positions of the force vector component parallel to the surface of the pipe, applied to the interior corner of the cavity, and the axial restraint force of the flange-connecting fasteners is small in comparison to conventional joint restraint assemblies.

The force vectors internal to the segment, produced by its self-actuating function, also have force vector components that are perpendicular to the pipe surface, and it is this vector component applied at the edge of the segment that forces the segment edge to penetrate the surface of the pipe. The corresponding force vector component perpendicular to the pipe surface, applied to the interior corner of the cavity, substantially adds to the loading applied radially to the joint restraint body. Accordingly, the configuration of the body is optimized to resist this additional loading and the tendency of the body to roll about an axis through its cross-sectional center of area. The optimum body cross-section is in the shape of a tee, with the top of the tee being adjacent to the surface of the pipe and the leg of the tee forming the radial bolt flange of the joint restraint assembly. This basic shape was modified as required to incorporate the cavities, threaded bores and seal features into the body.

Elastomeric material is installed between each end of the segment and the corresponding walls of the cavity in order to retain the segment in position for shipping, handling and installation. Elastomeric material is also installed between one face of the segment and its corresponding wall of the cavity in order to pre-position the segment against the opposite wall of the cavity. Accordingly, the segment is pre-positioned for appropriately making contact with the interior corner of the cavity and the pipe surface, as pre-loaded by the threaded bolt, so as to establish the self-actuating position of the segment.

The joint restraint assembly of the present invention can be configured to fit pipes of any size or material, and to join or attach to any other type of restraint, sealing assembly or other object. The joint restraint assembly can be made from any suitable material or combination of suitable materials. For example, the present invention can be made from ductile iron.

Figure 1A:
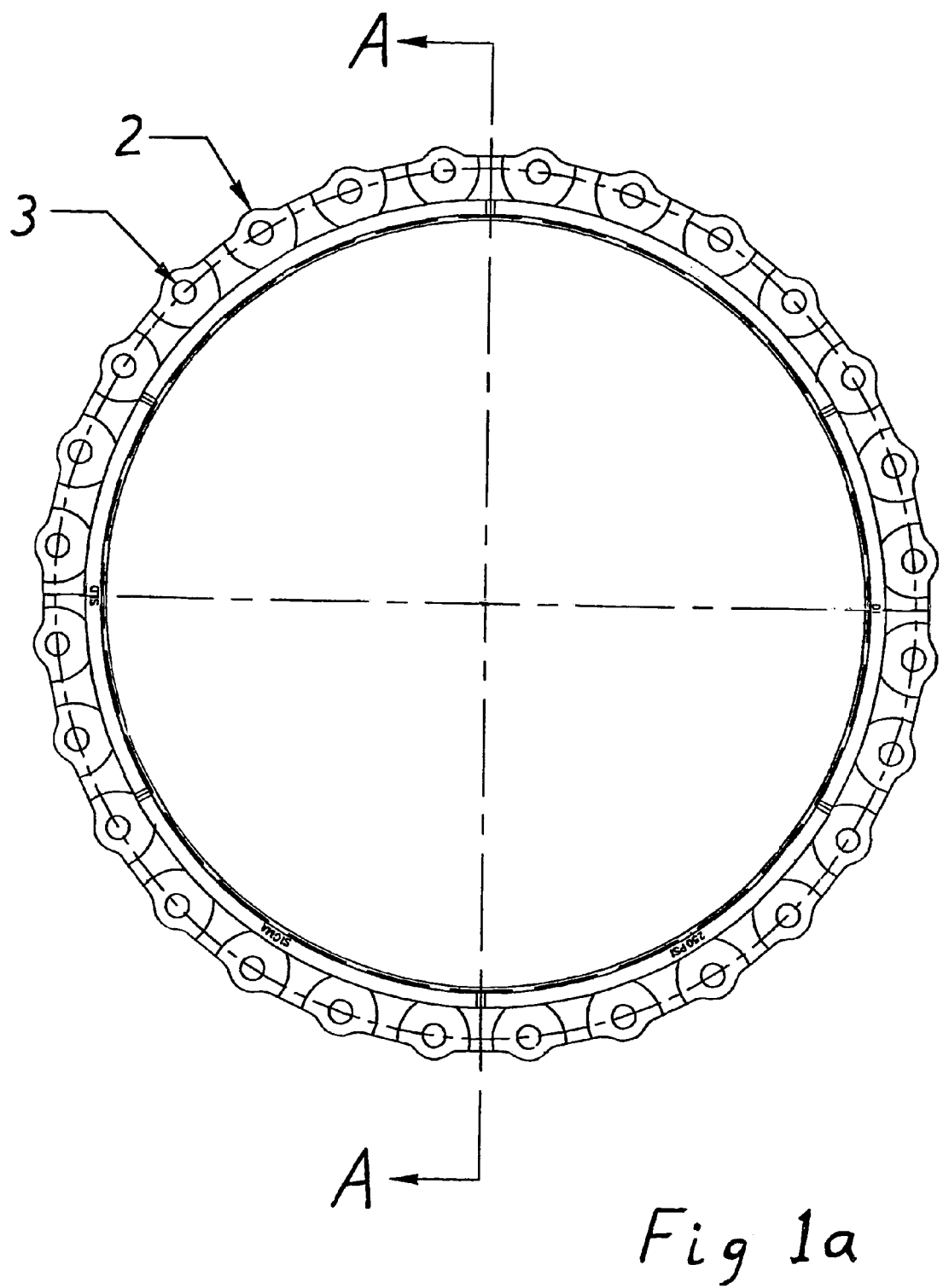
FIG. 1a is an elevation view, similar to the view of FIG. 1, showing only the joint restraint assembly body.

In particular, an elevation view, or end view opposite the gasket side, of a joint restraint assembly 1 embodying the present invention is shown in FIG. 1. Joint restraint assembly 1 comprises a substantially circular body 2, or gland, that is slipped over the end of a pipe (not shown), and a gasket (not shown) is then slipped over the end of the pipe. The body 2 (shown in FIG. 1a) comprises connecting apertures 3 disposed through body 2 generally parallel to the longitudinal axis of the pipe. Flange-connecting fasteners (not shown), typically T-bolts, extend through the connecting apertures 3 to connect the joint restraint assembly 1 to another pipe or fitting (not shown).

Figure 2:
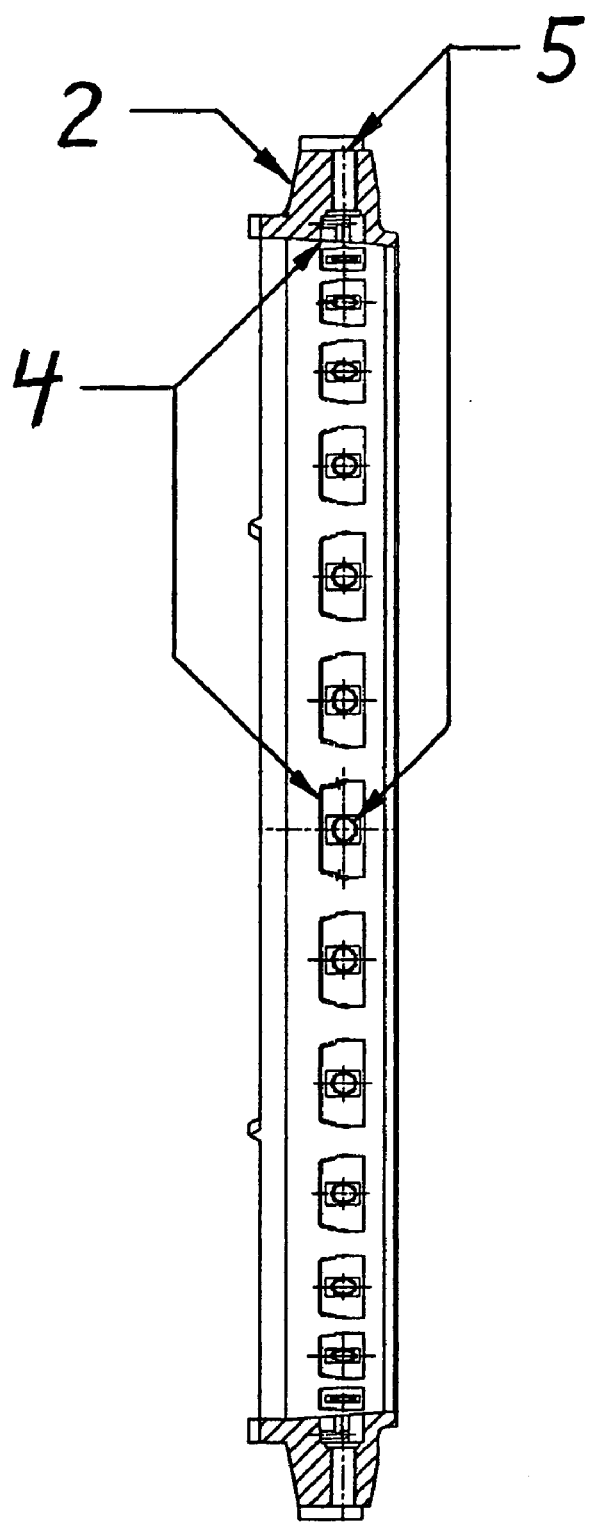
Figure 3:
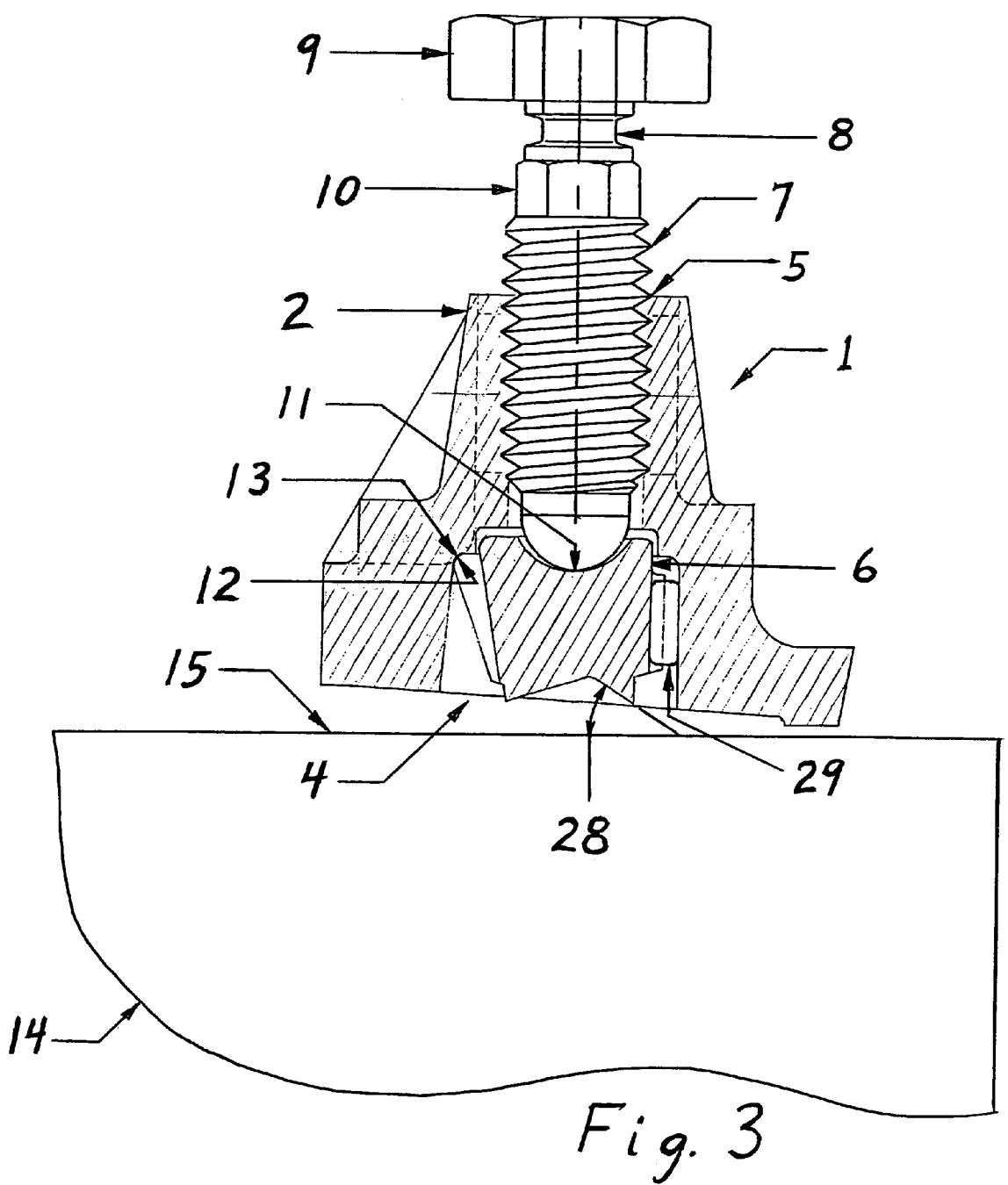
FIG. 3 is a section view taken through the center of a threaded bore and segment, along section plane C—C of FIG. 1, showing the segment in position for shipping and assembly onto a pipe.

As shown in FIG. 2, the body 2 of the joint restraint assembly 1 also comprises a plurality of cavities 4 adjacent to the surface of the pipe (not shown). A threaded bore 5 extends radially through body 2 into each cavity 4. A segment 6 is positioned within each cavity 4 in body 2 as shown in FIG. 3. A threaded bolt 7 extends through threaded bore 5 in body 2 to contact segment 6. The threaded bolt 7 comprises a reduced section 8 between an outboard hex head 9 and an inboard hex head 10, such that as torque is applied to outboard hex head 9, reduced section 8 shears at a pre-determined torque, and inboard hex head 10 remains attached to threaded bolt 7 for subsequent withdrawal of same, if needed. The end 11 of threaded bolt 7 is rounded to localize the contact with segment 6.

As shown in FIG. 3, assembled for shipping/handling and installation and slipping over the end of a pipe, each segment 6 is contained substantially within cavity 4 in body 2, with one corner 12 of segment 6 positioned in a corresponding interior corner 13 of cavity 4. Elastomeric material 29 is positioned between the sides of segment 6 and the walls of cavity 4 to maintain the segment in an optimum position for self-actuation.

Figure 4:
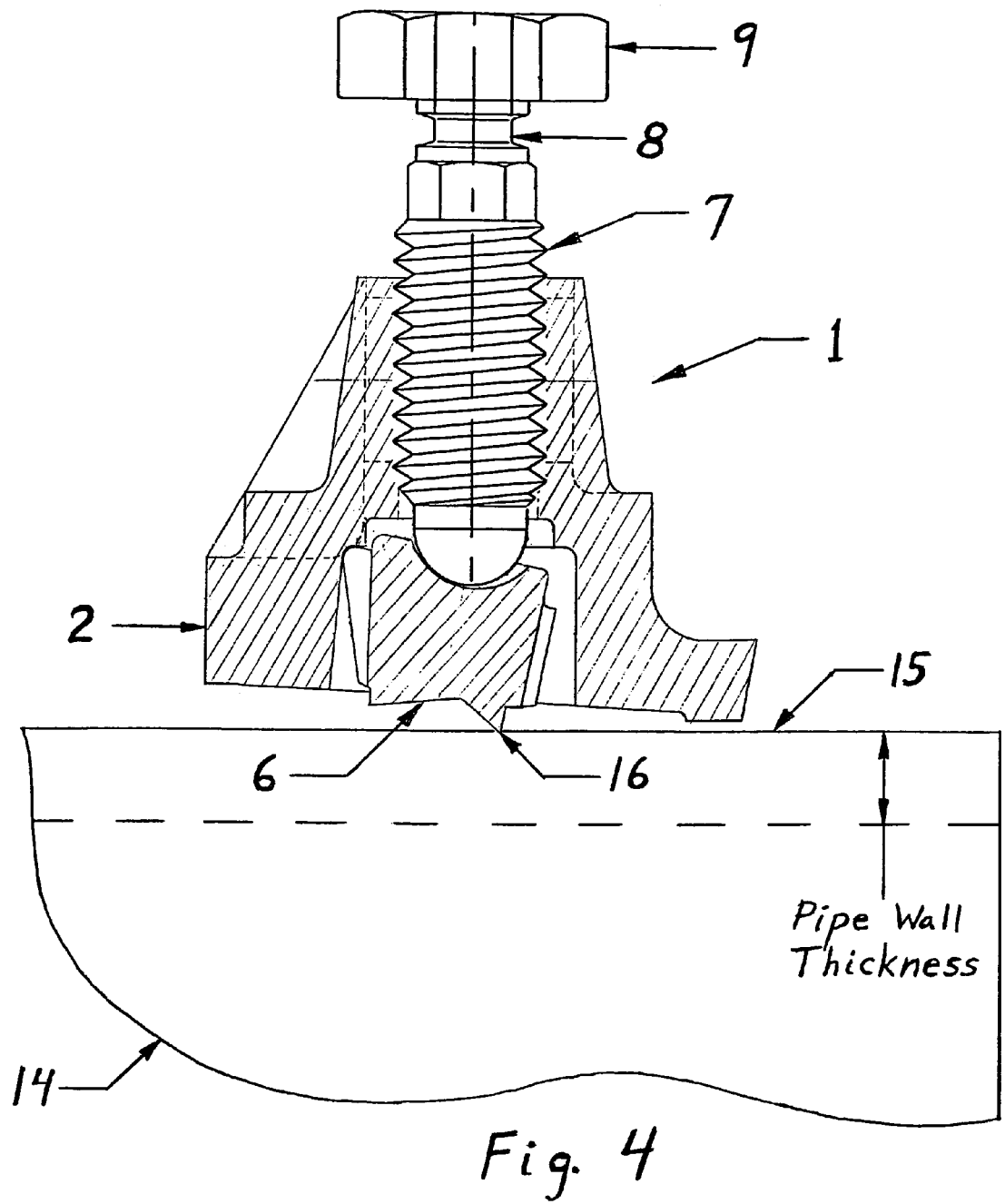
FIG. 4 is a section view taken through the center of a threaded bore and segment, along section plane C—C of FIG. 1, showing the segment during pre-loading on the surface of a pipe.

After joint restraint assembly 1 and a gasket (not shown) are properly positioned on the end of a pipe 14, all the threaded bolts 7 are sequentially and uniformly tightened to pre-load segments 6 against the pipe surface 15 as shown in FIG. 4. As each segment 6 is pre-loaded against pipe surface 15, the edge 16 of segment 6 makes a small indentation into the pipe surface 15. Pre-loading each segment 6 against the pipe surface 15 is complete when reduced section 8 of the respective threaded bolt 7 shears from the application of pre-determined torque to hex head 9.

Figure 5:
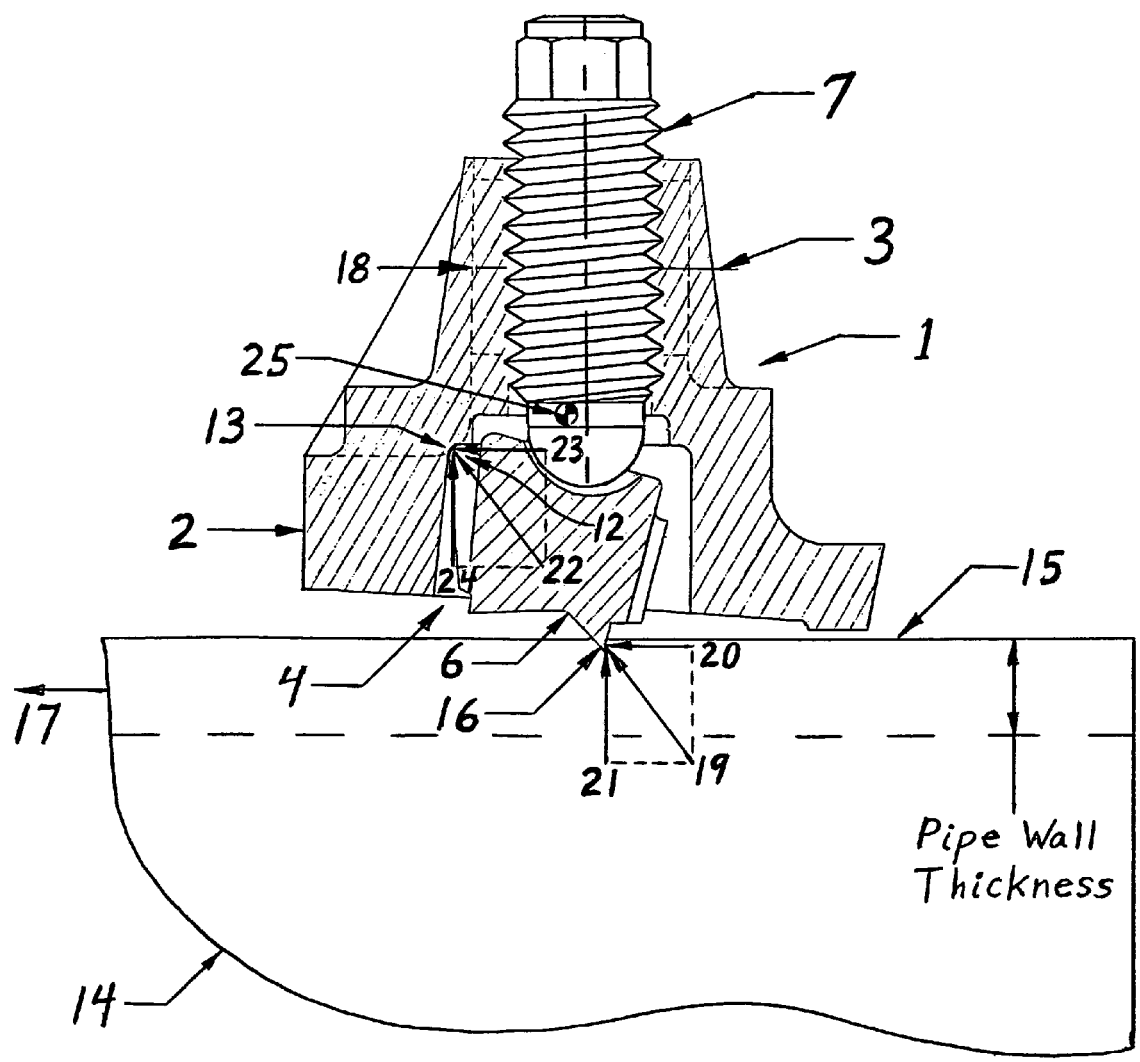
FIG. 5 is a section view taken through the center of a threaded bore and segment, along a section plane, similar to section plane C—C of FIG. 1, showing the segment in contact with the surface of a pipe and an interior corner of the cavity, the force vectors on the segment in transmitting the mechanical and/or pipe internal pressure loading while in use, and the self-actuating effect of the configuration.

The application of mechanical load to the pipe and/or pressure within the pipe produces pipe pull-out load 17 as indicated in FIG. 5, with resulting relative movement between the pipe and the restraint assembly, as described previously. The resisting load 18 is provided by the flange-connecting fasteners (not shown) extending through connecting apertures 3 in body 2. These opposing loads 17 & 18 cause corner 12 of segment 6 to load against interior corner 13 of cavity 4 to serve as a pivot, and edge 16 of segment 6 penetrates deeper into the pipe surface 15.

Pipe pull-out load 17 is applied longitudinally to segment 6 through force vector component 20. The direction of force vector 19 is defined by the geometry between the penetrating segment edge 16 and pivot corner 12, and the magnitude of force vector 19 is dependent upon this angle and the magnitude of vector component 20. The radial component 21 of force vector 19 is similarly dependent on the geometric angle of force vector 19 and its magnitude. Accordingly, radial vector component 21 is also dependent on the magnitude of vector component 20 and, in turn, pull-out load 17. The radial vector component 21 causes the segment edge 16 to penetrate pipe surface 15. As a result, after overcoming the comparatively small pre-load provided by threaded bolt 7, the depth of penetration of segment edge 16 into pipe surface 15, and thus the ability to resist pipe pull-out load 17, is directly proportional to the mechanical and/or internal pressure loading applied to the pipe—i.e., the mechanism is "self-actuating." Under these conditions, the threaded bolt 7 no longer contributes to the ability of the joint restraint assembly to resist the pull-out load 17, and threaded bolt 7 is not subjected to pull-out load 17 or damage therefrom; note in FIG. 5 that the rounded end of the threaded bolt 7 is no longer in contact with the segment 6. Thus, the self-actuating feature of the segment 6 operates independently of the threaded bolt 7.

Force vector 19 is transmitted through segment edge 16 to segment pivot 12 as force vector 22, thereby loading the segment edge primarily in compression. Force vector 22 has a longitudinal vector component 23, equal to both the pull-out load 17 and vector component 20, that transmits the load from segment 6 to body 2 at the cavity interior corner 13. Force vector component 23 is resisted by longitudinal force vector 18 from the flange-connecting fasteners (not shown) extending through connecting apertures 3 in body 2.

Figure 6:
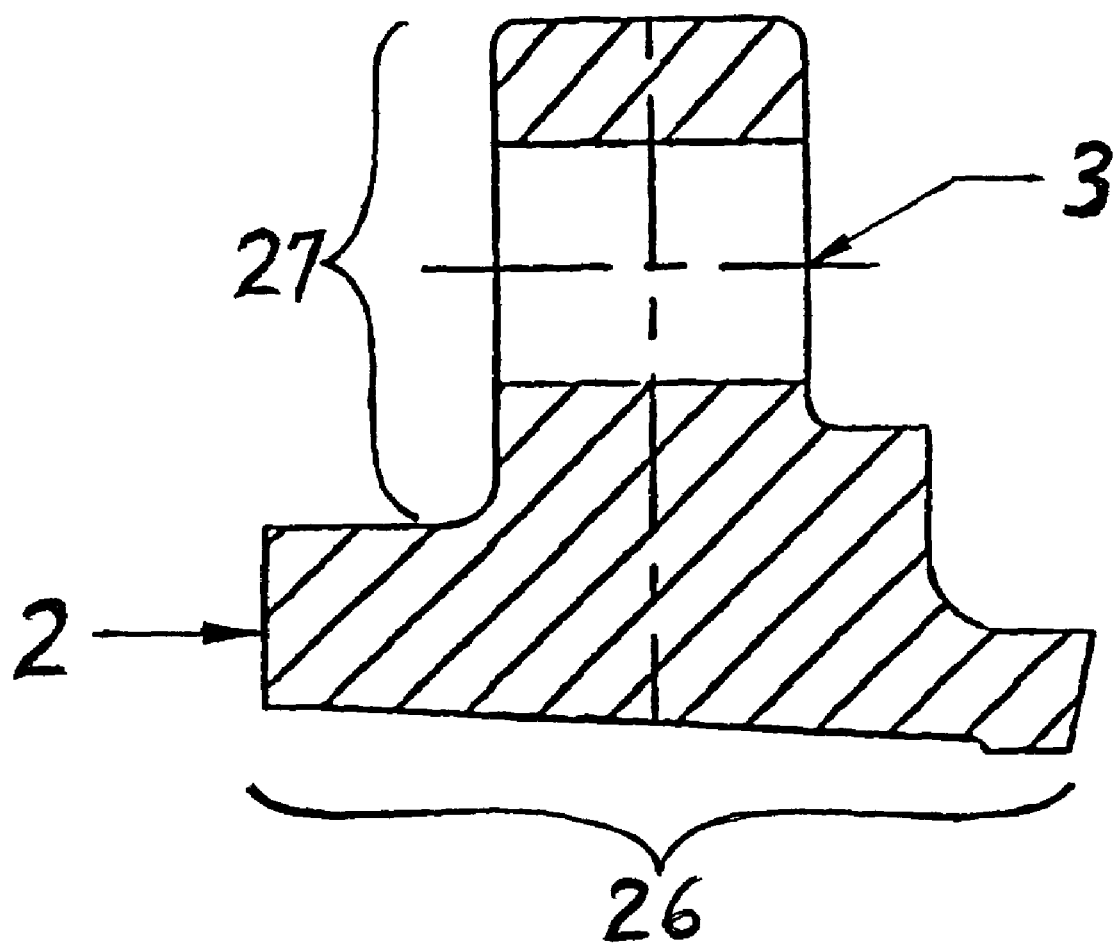
FIG. 6 is a section view taken through the connecting aperture in the flange portion of the body, along section plane B—B of FIG. 1, showing the basic tee shape of the pipe restraint body.

Force vector 22 has a radial vector component 24 that is equal to radial vector component 21. Vector component 24 is resisted by circumferential (hoop) stress induced within circular body 2. The distance between vector component 24 and the centroid 25 of the cross-section of body 2 tends to cause rolling of body 2 about its own centroidal axis. The distance between vector component 23 and resisting force vector 18 also tends to cause body 2 to roll in the same way. Accordingly, body 2 is shaped as shown in FIG. 6 to resist these circumferential and "rolling" stresses. The shape for body 2 found to be near optimum in resisting vector components 23 and 24 comprises a cylindrical portion 26 adjacent to the pipe surface 15 and a radial flange 27, perpendicular to the cylindrical portion, to serve as the flange for the flange-connecting fasteners (not shown). Thus, the basic cross-section of body 2 found to be near optimum was that of a Tee, with connecting apertures 3 disposed through the radial flange portion of body 2. Of course, this basic shape was altered in the vicinity of each cavity 4 as necessary to accommodate a segment 6 and threaded bore 5 as shown in FIG. 2 and FIG. 3.

The ability of segment edge 16 to penetrate pipe surface 15 is dependent on relief angle 28 as illustrated in FIG. 3. The maximum relief angle 28 is determined by the shape of segment 6 that produces a load path through segment edge 16 that is primarily compressive, to avoid loading the edge in shear. The optimum relief angle 28 is in the range of 25° to 35°.

It should be understood that the circumferential length of the plurality of segments 6 and their edges 16 comprises a substantial portion of the pipe periphery, thereby distributing the force transmitted through contact with the pipe more uniformly around the pipe periphery, and distributing the force transmitted through contact with the body more uniformly around the body.

Figure 7:
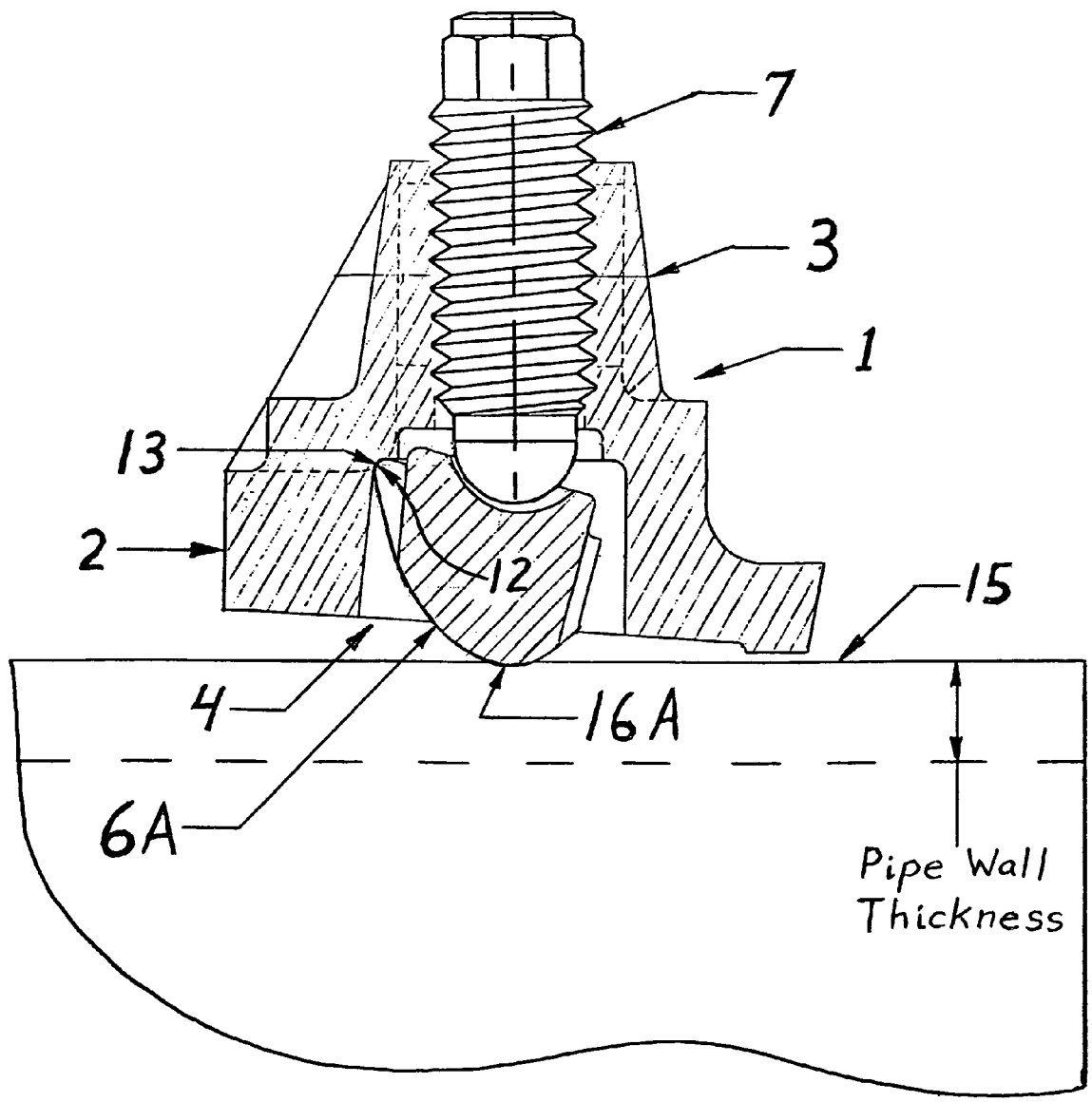
FIG. 7 is a section view of a second embodiment of the segment of the present invention taken along a view line similar to section plane C—C of FIG. 1, showing the self-actuating operation.
Figure 7A:
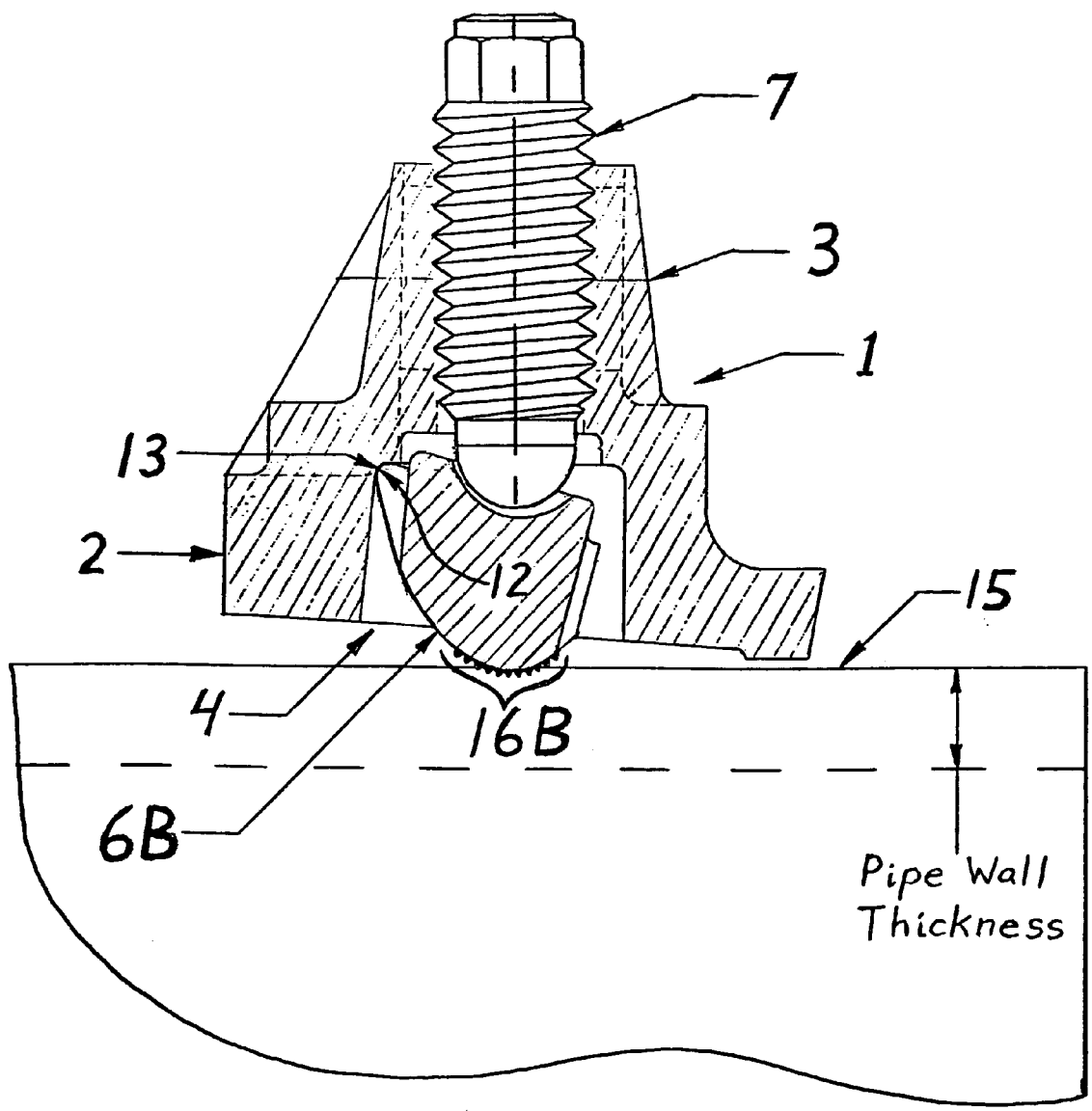
FIG. 7a is a section view of a third embodiment of the segment of the present invention taken along a view line similar to section plane C—C of FIG. 1, showing the self-actuating operation.

FIGS. 7 and 7a show other segment configurations that provide this "self-actuating" feature which provides resistance to pipe pull-out in proportion to the mechanical and/or internal pressure loading applied to the pipe. In particular, the segment 6A comprises a cam-shaped member which is initially pre-loaded via the threaded bolt 7, as discussed previously with regard to segment 6. As the mechanical and/or internal pressure loading increases, and relative movement occurs between the pipe and the restraint assembly, a cam surface 16A rotates against the pipe surface 15 and transfers the load, causing the corner 12 of segment 6A to load against interior corner 13 of the cavity 4. Again, this action occurs independently of the threaded bolt 7. Similarly, the segment 6B comprises a cam-shaped member having a surface texture 16B (e.g., knurled surface) that engages the pipe surface 15. As the mechanical and/or internal pressure loading increases, the textured cam surface 16B of the segment 6B rotates against, and penetrates, the pipe surface 15, and transfers the load, causing the corner 12 of segment 6B to load against interior corner 13 of the cavity 4. Again, this action occurs independently of the threaded bolt 7. Thus, it should be understood that the self-actuating segment of the present invention can be achieved using different segment configurations that are (1) pre-loaded by the threaded bolt 7 and (2) that engage the pipe surface 15 and body 2 to provide resistance to pipe pull-out in proportion to the mechanical and/or internal pressure loading applied to the pipe, independent of the threaded bolt.

While the invention has been described in detail and with reference to specific examples thereof, it will be apparent to one skilled in the art that various changes and modifications can be made therein without departing from the spirit and scope thereof.

What is claimed is:

1. A joint restraint assembly for connecting pipe ends together, or to other objects, by gripping the outer surface of a pipe, the joint restraint assembly comprising:
    a body encircling the pipe, with said body having a plurality of cavities adjacent the pipe and at least one set of a corresponding plurality of threaded bores disposed through said body, each threaded bore of said at least one set of a corresponding plurality of threaded bores being in communication with a respective cavity;
    a threaded bolt extending through each of said threaded bores;
    a segment disposed within each of said cavities in said body, said segment comprising a first portion that contacts a corner of said cavity and a second portion that penetrates the outer surface of the pipe;
    wherein said threaded bolt displaces said segment so that said second portion initially engages the outer surface of the pipe; and
    wherein as mechanical or internal pressure loading applied to the pipe increases pipe pull-out forces, said segment pivots about said first portion while said segment loses contact with said threaded bolt, and whereby said segment maintains contact with the corner of the cavity while driving said second portion deeper into the outer surface of the pipe in proportion to the applied mechanical or internal pressure loading, said segment resisting pipe pull-out in proportion to the increased mechanical or internal pressure loading applied to the pipe.

2. The joint restraint assembly of claim 1 wherein said segment transmits the load from the pipe to said body while loading said segment primarily in compression.

3. The joint restraint assembly of claim 2 wherein said second portion comprises at least one edge which penetrates the outer surface of the pipe.

4. The joint restraint assembly of claim 3 wherein said at least one edge forms a relief angle, as measured from the outer surface of the pipe, that is 25 to 35 degrees.

5. The joint restraint assembly of claim 2 wherein the circumferential length of all of said segments and their edges comprises a substantial portion of the pipe periphery.

6. The joint restraint assembly of claim 1 wherein the shape of the body is optimized to resist the forces imparted to it by contact with said segments, said body comprising:
    a substantially cylindrical portion adjacent to the pipe surface with a flange extending radially therefrom; and
    wherein said body comprises a shape and wall thickness that compensates for the presence of said cavities for maintaining the strength and rigidity of said body.

7. The joint restraint assembly of claim 1 further comprising an elastomeric material positioned between each of said segments and their corresponding cavities, said elastomeric material disposing said segment in said cavity in an optimum position for self-actuation or for retaining said segment in said cavity for shipping, handling and installation.

8. A joint restraint assembly for connecting pipe ends together, or to other objects, by gripping the outer surface of a pipe, the joint restraint assembly comprising:
    a body encircling the pipe, with said body having a plurality of cavities adjacent the pipe and at least one set of a corresponding plurality of threaded bores disposed through said body, each threaded bore of said at least one set of a corresponding plurality of threaded bores being in communication with a respective cavity;
    a threaded bolt extending through each of said threaded bores;
    a segment disposed within each of said cavities in said body, said segment comprising a first portion that contacts a corner of said cavity and a cam surface that engages and rotates against, but does not substantially penetrate, the outer surface of the pipe;
    wherein said threaded bolt displaces said segment so that said cam surface initially engages the outer surface of the pipe; and
    wherein as mechanical or internal pressure loading applied to the pipe increases pipe pull-out forces, said segment pivots about said first portion and said cam surface rotates against the outer surface of the pipe, while said segment loses contact with said threaded bolt, and said segment maintains contact with said corner of the cavity, in proportion to the applied mechanical or internal pressure loading, said segment resisting pipe pull-out in proportion to the increased mechanical loading or internal pipe pressure.

9. The joint restraint assembly of claim 8 wherein said segment transmits the load from the pipe to said body while loading said segment primarily in compression.

10. The joint restraint assembly of claim 8 wherein said cam surface further comprises a surface texture for engaging the pipe surface.

11. The joint restraint assembly of claim 10 further comprising a threaded bolt extending through each of said threaded bores, said threaded bolt displacing said segment so that said cam surface initially engages said outer surface of the pipe, and wherein said segment pivots about said first portion while losing contact with said threaded bolt.

12. The joint restraint assembly of claim 10 wherein said segment transmits the load from the pipe to said body while loading said segment primarily in compression.

13. The joint restraint assembly of claim 3 wherein said first portion comprises a segment corner opposite said at least one edge, said segment corner contacting said corner of said cavity.

14. The joint restraint assembly of claim 8 wherein said first portion comprises a segment corner opposite said cam surface, said segment corner contacting said of said cavity.

* * * * *